United States Patent [19]

Figueroa

[11] 3,866,131

[45] Feb. 11, 1975

[54] INTEGERATOR SYSTEM OF WIDE RANGE AND PUMP CIRCUIT THEREFOR

[75] Inventor: David R. Figueroa, Hialeah, Fla.

[73] Assignee: Coulter Electronics, Inc., Hialeah, Fla.

[22] Filed: Aug. 20, 1973

[21] Appl. No.: 389,711

[52] U.S. Cl. ............ 328/152, 328/150, 328/116, 328/127

[51] Int. Cl. ............................. H03k 13/06

[58] Field of Search ......... 328/116, 117, 152, 153, 328/127; 307/228, 235

[56] References Cited
UNITED STATES PATENTS

| | | |
|---|---|---|
| 2,529,666 | 11/1950 | Sands .......................... 328/117 |
| 2,817,771 | 12/1957 | Barnothy ...................... 307/235 |
| 3,041,469 | 6/1962 | Ross ............................. 307/235 |
| 3,216,005 | 11/1965 | Hoffman et al. ............. 307/235 X |
| 3,335,292 | 8/1967 | Alburger ...................... 307/235 X |
| 3,555,305 | 1/1971 | Luczkowski ................. 307/228 X |
| 3,710,263 | 1/1973 | Doty et al. ................... 328/116 X |
| 3,761,826 | 9/1973 | Lowe ........................... 328/153 X |

Primary Examiner—John S. Heyman
Attorney, Agent, or Firm—Silverman & Cass, LTD.

[57] ABSTRACT

A system for integrating electrical quantities of a very large range of magnitudes employing a plurality of integrating sub-ranges. The system includes a new electric pump circuit which feeds signals into the integrating system.

14 Claims, 6 Drawing Figures

INTEGERATOR SYSTEM OF WIDE RANGE AND PUMP CIRCUIT THEREFOR

BACKGROUND OF THE INVENTION

The invention relates to the art of integrating electric quantities such as electric pulses having a wide range of magnitudes.

By way of example, in the field of analyzing, measuring and counting particles suspended in a liquid in which the well known Coulter type counter has been used with rather good results, there has long been felt a need for a system capable of integrating electrical quantities ranging from very small magnitudes to very large ones. This need grew out of the fact that the particles suspended in the liquid, such as for instance blood, may be of very minute sizes but may go up to relatively large sizes, such that the total range may reach a proportion of over 60,000 to 1. The Coulter method as set forth in its basic principles in U.S. Pat. No. 2,656,508 is predicated on the idea that the particles in passing through an electric sensing zone produce pulses the magnitudes of which are directly proportional to the volumes of the measured particles.

Since the range of particles is in the order of over 60,000 to 1, it is obvious that the same wide range is required with regard to electric pulses produced by the particles, and an integrator used for accumulating and counting the pulses has to have the same wide range.

However, in the prior art no such wide range integrator was available. This is due to the fact that the prior art integrator was usually restricted by the power supply voltage, signal to noise ratio and inherent limits of the devices used.

The present invention provides a system comprising a number of integrators of various ranges, and a control network adapted to accumulate electrical input charges covering a very wide total range. In fact, the range of electrical input charges accomplished by the invention using four integrating ranges, is over 64,000 to 1. Prior art integration required 32 ranges for covering such total range.

SUMMARY OF THE INVENTION

An electrical integrating system including a plurality of integrators covering together a large total range of charges, including an electric pump circuit comprising diodes which are not reverse biased.

DESCRIPTION OF THE PREFERRED EMBODIMENTS

Figure 1:
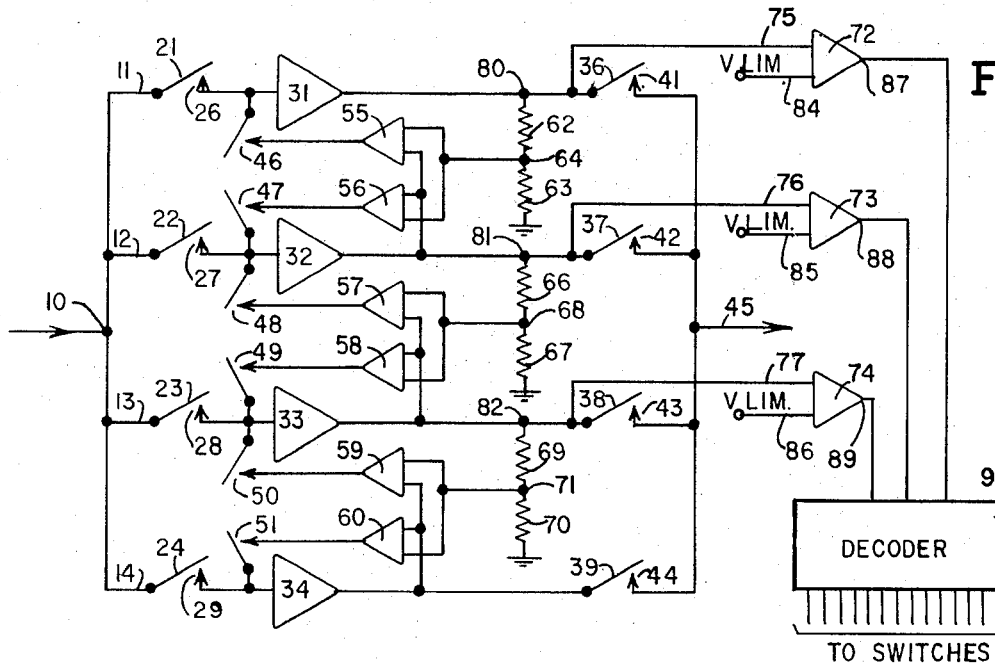
FIG. 1 illustrates an integrating system according to the invention using four integrating ranges.

In FIG. 1, the basic circuit of a system of integration is illustrated using four integrating stages.

The input terminal 10 of the integrating system is connected to four parallel channels 11, 12, 13 and 14 having respectively one way switches 21, 22, 23 and 24. Output terminals 26 to 29 of the switches 21 to 24 respectively are coupled to integrators 31, 32, 33 and 34. The output sides of the integrators 31 to 34 respectively are coupled to switches 36 to 39. The output terminals 41 to 44 respectively of switches 36 to 39 are connected to an output terminal 45 of the integrating system.

At the outputs 26 to 29 of switches 21 to 24 respectively differential amplifiers 55 to 60 are coupled via switches 46 to 51. Each of the amplifiers 55 to 60 has a positive and a negative input terminal. The six amplifiers are arranged in three pairs, i.e. a first pair of amplifiers 55, 56, a second pair 57, 58 and a third pair 59, 60. In each pair of amplifiers a positive terminal of a first amplifier is connected to a negative terminal of a second amplifier, and a negative terminal of a first amplifier is connected to a positive terminal of a second amplifier.

A voltage divider comprising resistors 62, 63 is connected through a node 64 therebetween, to the lead connecting the positive and negative terminals respectively of the amplifiers 55, 56. The free terminal of resistor 63 is connected to ground. Two other voltage dividers with resistors 66, 67 and 69, 70, having respectively nodes 68 and 71 are similarly connected to the terminals of amplifiers 57, 58 and 59, 60. The free terminals of the resistors 67 and 70 respectively are connected to ground. The values of each of the pairs of resistors are dimensioned such as to provide a 16 to 1 voltage divider action. Comparators 72, 73 and 74 respectively have the first inputs thereof 75, 76 and 77 connected to the free terminals 80, 81 and 82 of resistors 62, 66 and 69. The second inputs 84, 85 and 86 of comparators 72, 73 and 74 are coupled to a voltage source $V_{lim}$. The outputs 87, 88 and 89 of comparators 72, 73 and 74 respectively are coupled to a decoder 90. Output lines of the decoder 90 lead to the switches for selection and operation of the integrators.

In the operation of the integrating system, in the initial condition, wherein the output terminal 45 has a voltage of zero, the switches 21, 36, 47, 49 and 51 are closed and all other switches are open. This condition prevails until the output of the integrator 31 exceeds $V_{lim}$. This causes comparator 72 to change output state resulting in the decoder 90 changing the condition of the switches 22, 37, 46, 49 and 51 to be closed and all other switches to be open.

At this moment, the voltage at the output 45 is the output of integrator 32. The output of integrator 32 has been maintained at 1/16 of the output of integrator 31 by virtue of the divider action of resistors 62, 63. The value of 1/16 has been kept while integrator 31 was integrating.

When, as previously stated, there is a change from range 1 to range 2, the integrator 32 has a voltage of 1/16 of integrator 31 equal to 1/16 of $V_{lim}$.

It will be noted that four conditions are created in the system as follows:

Condition A:
All integrator outputs are at zero volts, switches 21, 36, 47, 49 and 51 are closed, and all other switches are open.

Condition B:
Integrator 31 exceeds $V_{lim}$, integrators 32, 33 and 34 do not, switches 22, 37, 46, 49 and 51 are closed and all other switches are open.

Condition C:
Integrators 31, 32 exceed $V_{lim}$, integrators 33 and 34 do not, switches 23, 38, 46, 48 and 51 are closed and all other switches are open.

Condition D:
Integrators 31, 32, 33 exceed $V_{lim}$, switches 24, 39, 46, 48 and 50 are closed and all other switches are open.

In designating the output voltages of the four integrators respectively as $E_1$, $E_2$, $E_3$, and $E_4$ it will be readily appreciated that in condition A, $$E_1 = 16\ E_2 = 256\ E_3 = 4096\ E_4.$$

Accordingly, in condition B when $E_1 > V_{lim}$, $$E_2 = 16\ E_3 = 256\ E_4,$$

and in condition C, $$E_3 = 16\ E_4.$$

As a result, a total overall range of 65,536 to 1 is achieved.

Figure 2:
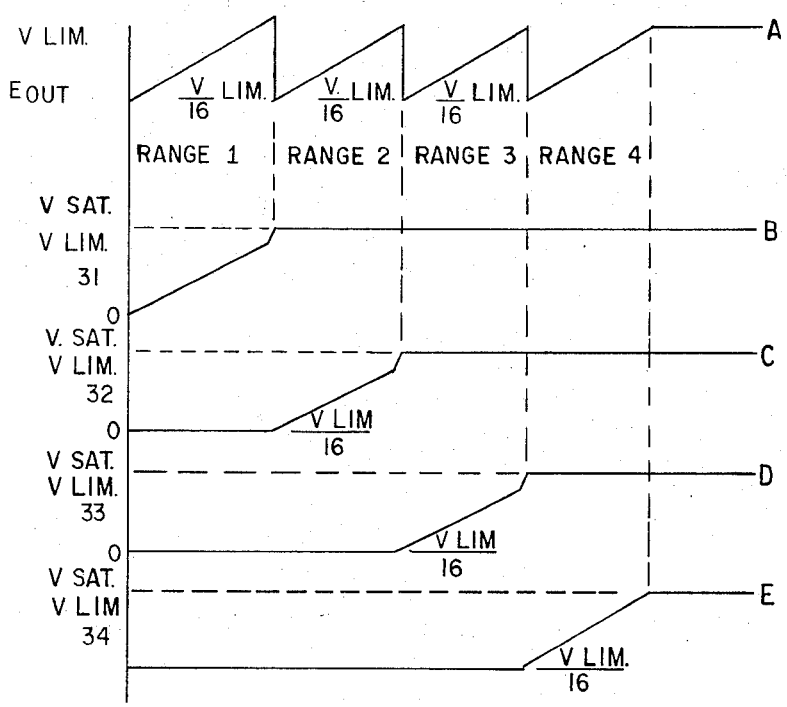
FIG. 2 illustrates voltage curves in the four ranges.

An illustration of the operation in the four ranges is given in FIG. 2 showing the voltages in each range ramping up to $V_{lim}$ performed by the four integrators 31 to 34, see FIG. 2A. The outputs of integrators 31 to 34 are shown in FIG. 2 as curves B, C, D and E respectively.

It is to be noted that when switch 46 is closed, a feedback loop comprising resistor 62 and differential amplifier 55 prevent integrator 31 from further integration, the output of integrator 31 being 16 times the output of integrator 32, whereupon integrator 31 saturates and is maintained at this saturation voltage $V_{sat}$ as illustrated in FIG. 2.

It will be appreciated that an absolute error in integrating in a system using four ranges will be smaller than in a system using only one range.

INTEGRATOR PUMP

A circuit feeding signals into the wide range integrator previously described is an integrator pump.

Figure 3:
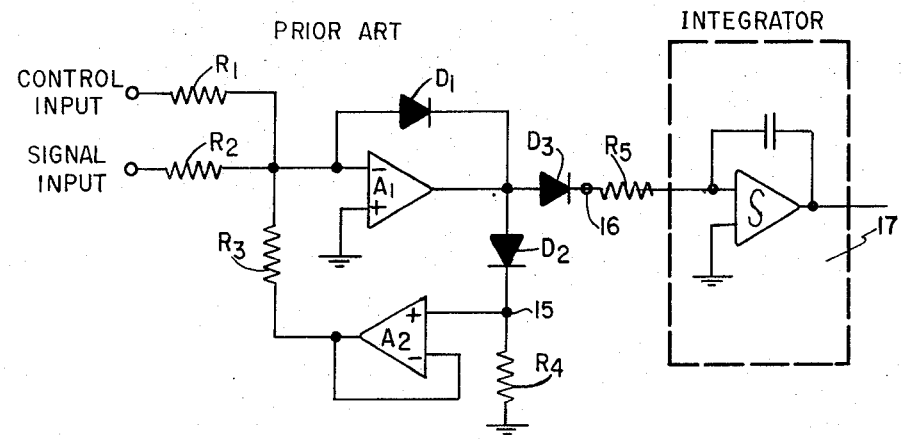
FIG. 3 shows a pump circuit of the prior art.
Figure 4:
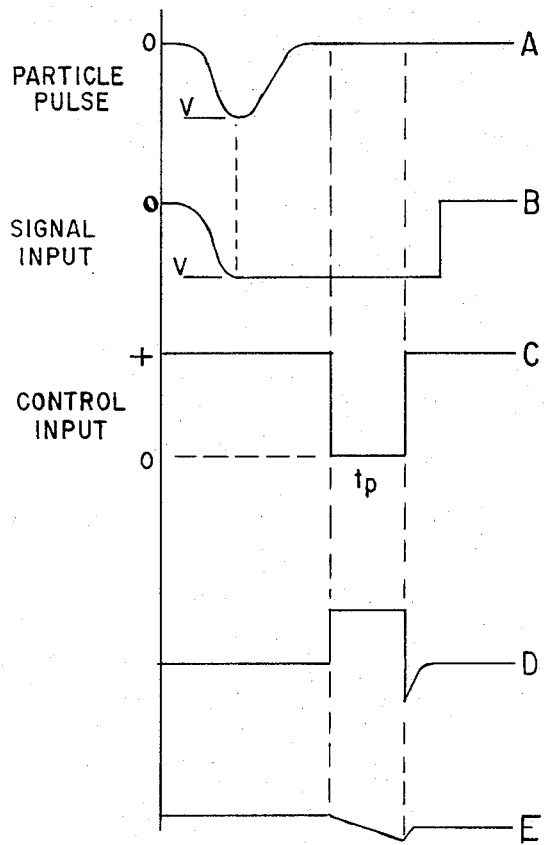
FIG. 4 illustrates pulse curves pertinent to the pump circuit of FIG. 3.

FIGS. 3 and 4 show an integrator pump circuit as existing in the prior art, and the characteristic pulse curves thereof. A short discussion of structure and operation will reveal the shortcomings of the prior art circuit.

The signal input terminal receives a stretched particle pulse, which is shown as negative going. After the signal is processed, the pulse stretcher is reset and the stretched pulse ends. At the control input terminal a one shot pulse is received which determines when the particle pulse is sensed and it is known that it is being stretched. The one shot pulse ends prior to reset, the pulse width being $t_p$.

A signal $E_{in}$ flows through resistor $R_2$ to amplifier $A_1$, where it is amplified and inverted with a feedback through diode $D_2$ to amplifier $A_2$ and resistor $R_3$. The feedback causes the output voltage $E_{out}$ to be in a fixed proportion to the input voltage, i.e. gives a constant $E_{out}$ over $E_{in}$.

Amplifier $A_2$ is a buffer amplifier with a ratio of input over output equal to 1. The current through diode $D_2$ is equal to the current through resistor $R_4$. Diodes $D_2$, $D_3$ are similar diodes. The current through diode $D_3$ is equal to the current through resistor $R_5$. If resistors $R_4$, $R_5$ are equal, the currents through diodes $D_2$, $D_3$ are also equal, and the voltages across the diodes are equal.

During the control input pulse $t_p$, the voltages at nodes 15, 16 have a fixed relation to the input signal. At any other time besides $t_p$, the output voltage of amplifier A, is negative, which causes the diode $D_1$ to conduct, diodes $D_2$, $D_3$ being reverse biased. Since at times outside $t_p$ the diodes $D_2$, $D_3$ are kept from conducting, this prevents charge from drifting in integrator 17 from the correct stored value.

The resulting curve at node 16, as shown in FIG. 4D, has an undesirable overshoot. The amount of the overshoot is related to factors other than particle pulse amplitude. The overshoot is dependent upon certain circuit conditions and not upon the particle pulse. Therefore, when no input signal is present, the overshoot charge would still be fed to the integrator, which certainly is undesirable, since it leads to wrong results in the integrator.

It will be noted that the overshoot charge is due to the reverse bias of diodes $D_2$ and $D_3$. Therefore, in order to eliminate such charge it would seem appropriate to remove the reverse bias of diodes $D_2$ and $D_3$.

In the past, the best that could be done was to minimize the reverse biasing of diodes $D_2$, $D_3$ by the forward voltage drop of the diode $D_1$ which was very small.

By using a positive pulse at the control input, the diode $D_1$ was reverse biased which reduced the drop at the output of the amplifier $A_1$.

Figure 5:
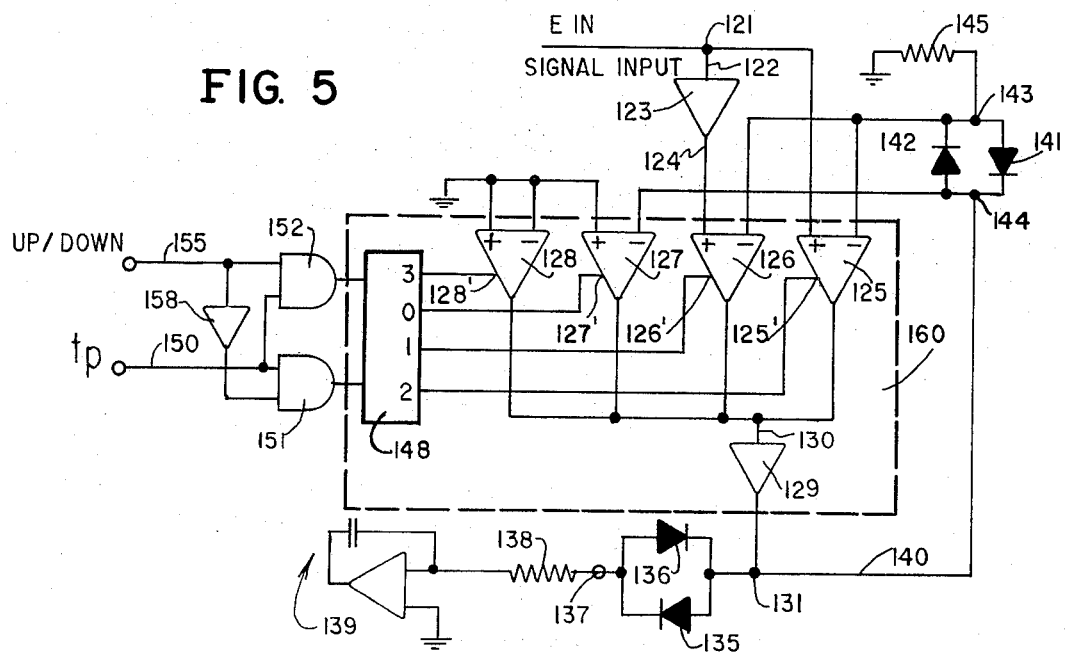
FIG. 5 shows a schematic diagram of the pump circuit according to the invention.
Figure 6:
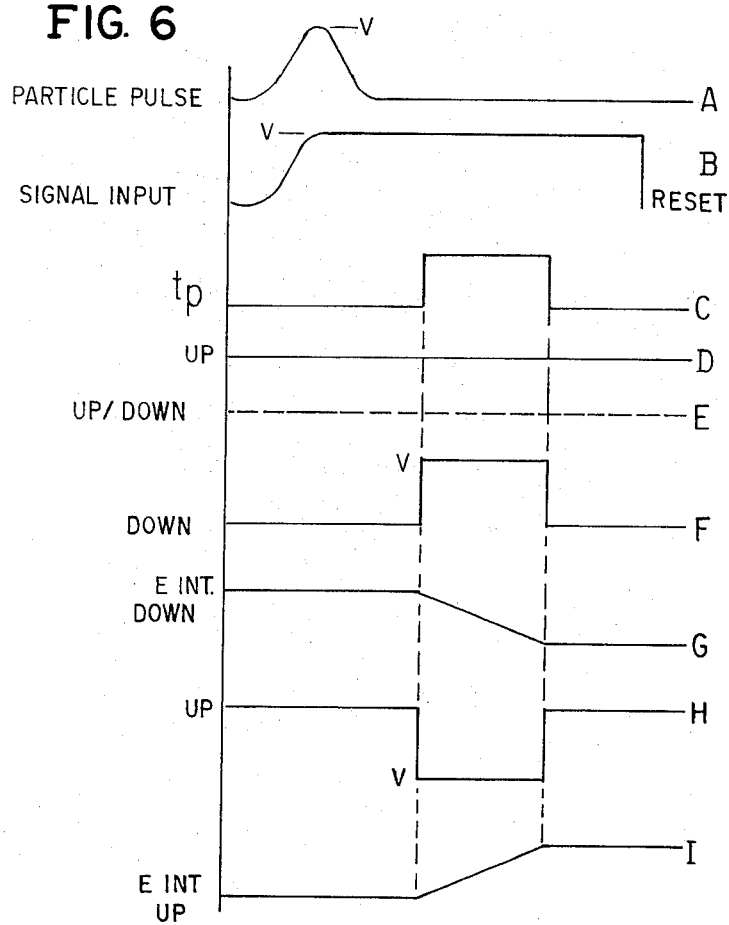
FIG. 6 illustrates pulse curves pertinent to the pump circuit of FIG. 5.

The new pump circuit and the pertinent curves are illustrated in FIGS. 5 and 6. In FIG. 5 terminal 121 represents the signal input $E_{in}$. The input terminal is connected by lead 122 to an inverting amplifier 123, the output thereof being connected by line 124 to the positive input of an amplifier 126 which is one of a series of front end amplifiers 125 to 128 having similar functions and comprising respectively control terminals 125' to 128'. The outputs of the amplifiers 125 to 128 are connected to an output stage amplifier 129 by a common connection 130. The output of amplifier 129 is coupled via a node 131, two diodes 135, 136, a terminal 137 and a resistor 138 to an integrator 139 which is similar to the integrator 17 in FIG. 3.

A feedback line 140 leads from the output of amplifier 129 to the negative input of amplifier 127 and parallel thereto over two diodes 141, 142, terminal 143 to the negative inputs of amplifiers 125, 126. The terminal 143 is coupled over a resistor 145 to ground.

The control terminals 125' to 128' of the amplifiers 125 to 128 respectively are connected to a digital selection network 148. A line 150 for the control input $t_p$ is connected to first inputs of two AND gates 151, 152. A line 155 for an up/down signal as explained hereinafter is connected to a second input of the AND gate 152. The line 155 is also coupled over an inverter amplifier 158 to a second input of the AND gate 151. The outputs of the AND gates 151, 152 respectively are connected to the digital selection network 148. An assembly of elements as indicated by a dotted frame 160 is a programmable amplifier module, a Harris semiconductor 14A2400. The programmable module includes the amplifiers 125 to 128, the digital selection network 148 and the output stage amplifier 129.

The AND gates 151, 152 may be of the type TISN 7408. The inverter amplifier 158 is similar to the type TISN 7404. Amplifier 123 is an inverting amplifier with a gain of one.

In operation, an up or down signal, as will subsequently be explained, may be received on the up/down input line 155. An up/down signal is a d.c. signal which is either high or low depending upon whether it is desirous to have the output of the integrator 139 charge up or down. For explanation, assume a down signal, i.e. a low d.c. signal is sent onto the up/down input 155. When $t_p$ is not present, amplifier 127 is selected by the digital selection network 148 by having an enable input signal sent to control terminal 127'. The amplifiers 125, 126 and 128 are off.

The output of node 131 is zero since the input of amplifier 127 is zero, i.e. it is not coupled to $E_{in}$.

During $t_p$ a switch is made from the select line to amplifier 127 to the select line for amplifier 125, having an enable signal on control line 125'. $E_{in}$ is coupled to the input of amplifier 125, and the output at node 131 is approximately unity gain plus the diode drop voltage of diode 142. A positive signal is sent to the integrator 139.

The voltage at nodes 137 and 143 during $t_p$ is equal to the input signal as long as the diodes 135 and 142 are similar and the diodes 136 and 141 are also similar.

At the end of $t_p$, the amplifier 127 is again selected, forcing the output voltage to be zero again i.e. placing zero charge to the integrator 139.

FIG. 6F represents the voltage curve at nodes 137 and 143. The voltage output of the integrator 139 is shown at FIG. 6G.

If as shown in curve 6D an up voltage is placed upon input line 155, amplifier 126 is activated, $E_{in}$ is inverted, $-E_{in}$ is supplied to the integrator 139, and diodes 136 and 141 are conducting. FIG. 6H represents the voltage at nodes 137 and 143. FIG. 6I represents the voltage at the output of the integrator 139.

The advantages of the new pump circuit are as follows:

During off time, the diodes 135, 136, 141 and 142 have zero volts across them. There are no reverse biased diodes present in this circuit, there is no excess charge and there is no leakage through the diodes.

The single circuit allows both up and down operation of the integrator 139, i.e. representing a bipolar operation.

In the prior art circuit, the control input had to be switched from some voltage to zero volts, but maintaining zero volts was critical, and there was error caused by the non-zero control voltage when switched to zero. In the new circuit, the control voltage is a digital signal and the precise control voltages are not critical.

Finally, prior art pump circuits could handle a signal range of 2 to 1, i.e. 10 volts to 5 volts at output.

The new circuit is capable of handling a signal range of at least 16 to 1, because charge error has been eliminated. Also, the leakage current has been disposed of, thus removing a source of error. Another source of error has been eliminated by avoiding the requirement of accurateness of the control signal.

It is believed that the foregoing adequately will enable those skilled in the art to appreciate and practice this invention and, if necessary, make modifications, which would fall within the scope of the invention as defined by the accompanying claims.

What is desired to be secured by Letters Patent of the United States is:

1. Apparatus for integrating electrical quantities of a wide range of magnitudes, comprising:
    A. means for receiving said quantities as electric pulses,
    B. a plurality of integrating stages connected to said receiving means for selectively receiving and accumulating said pulses,
    C. voltage dividing means coupled to said integrating stages for establishing varying contiguous ranges for said integrating stages,
    D. comparing means connected to the outputs of said integrating stages for sensing critical values of said accumulated electric quantities, and
    E. control means coupled to said comparing means for activating and deactivating integrating stages in response to said critical values of electric quantities.

2. Apparatus as set forth in claim 1 coupled to an integrator pump circuit which comprises:
    A. means for receiving input signals,
    B. programmable amplifier module means coupled to said signal receiving means,
    C. means for receiving control signals connected to said module means, including gate means,
    D. first diode means connected to the input side of said module means,
    E. second diode means coupled to the output side of said module means, and
    F. means for coupling said second diode means to the wide range integrating apparatus including resistor means.

3. Apparatus as set forth in claim 1, in which the means for receiving the electrical quantities comprises,
    A. an input terminal
    B. a plurality of channels connected in parallel to said input terminal, and
    C. a plurality of first one way switches each arranged at the input side of one of said channels respectively and having an input terminal and an output terminal,
the apparatus further comprising means for receiving the outputs of the integrating stages, including an output terminal coupled in parallel to the integrating stages.

4. Apparatus as set forth in claim 3, in which each integrating stage is arranged in one of the channels respectively, and comprises,
    A. an integrator, the input thereof connected to the output terminal of the one way switch in the respective channel,
    B. a second one way switch having an input terminal and an output terminal, the output of the integrator being connected to the input terminal of the respective second one way switch, wherein the output terminals of the second one way switches are connected in parallel to the output terminal of the apparatus.

5. Apparatus as set forth in claim 4, in which said comparing means includes a comparator having,
    A. a first input terminal
    B. a second input terminal, and
    C. an output terminal, wherein the first input terminal of the comparator is connected to the input terminal of the respective second one way switch, and the second input terminal of the comparator is connected to a voltage source having a predetermined voltage, and the output terminal of the comparator is coupled to said control means.

6. Apparatus as set forth in claim 4, comprising,
a plurality of differential amplifiers, each amplifier having a positive input terminal, a negative input terminal and an output terminal, the differential amplifiers being arranged in pairs, such that a positive input terminal of the first amplifier is connected to a negative input terminal of the second amplifier, and a negative input terminal of the first amplifier is connected to the positive input terminal of the second amplifier.

7. Apparatus as set forth in claim 6, in which the voltage dividing means comprises a first resistor, a second resistor coupled by a node to the first resistor, the node being connected to the positive and negative terminals of the first and second amplifiers, the free terminal of the first resistor connected to the output of the integrator, and the free terminal of the second resistor connected to the ground.

8. Apparatus as set forth in claim 7, in which the number of integrating stages is four, and the number of amplifiers is six arranged in three pairs.

9. Apparatus as set forth in claim 8, in which the resistors are dimensioned such that the ratio between the resistances thereof is 16 to 1.

10. Apparatus as set forth in claim 2, in which the means for receiving input signals comprises,
  A. first input terminal
  B. an inverting amplifier, the input thereof connected to said first input terminal, the output thereof being connected to the positive terminal of the first amplifier of said module means, and
  C. a line connecting said first input terminal, to a second amplifier of said module means.

11. Apparatus as set forth in claim 10, in which the means for receiving control signals comprise,
  A. a second input terminal for receiving a first control signal, and
  B. a third input terminal for receiving a second control signal.

12. Apparatus as set forth in claim 11, in which the gate means include
  A. a first AND gate, having a first input and a second input,
  B. a second AND gate, having a first input and a second input, the second input of the first AND gate being connected to the first input of the second AND gate, and
  C. a second inverting amplifier, the input thereof connected to said second input terminal for receiving said first control signal, the output of the second inverting amplifier connected to the first input of the first AND gate.

13. Apparatus as set forth in claim 12, in which the first diode means comprise a first diode and a second diode arranged in series in a first brige circuit, the circuit having a first node and a second node, the nodes connected to opposite poles of the first and second diodes, the first node coupled to the output of the said nodule means, the second node coupled to ground over a first resistor.

14. Apparatus as set forth in claim 13 in which the second diode means comprise a third diode and a fourth diode arranged in series in a second bridge circuit, the circuit having a third node and a fourth node, the nodes connected to opposite poles of the third and fourth diodes, the third node coupled to the wide range integrating apparatus, the fourth node connected to the output of said nodule means.

* * * * *